United States Patent
Ganesan et al.

(10) Patent No.: US 10,644,635 B2
(45) Date of Patent: May 5, 2020

(54) SYSTEMS AND METHODS FOR MOTOR DRIVE CABLE CHARACTERISTICS IDENTIFICATION AND COMPENSATION THEREFOR

(71) Applicant: Rockwell Automation Technologies, Inc., Mayfield Heights, OH (US)

(72) Inventors: Nandini Ganesan, Milwaukee, WI (US); Rangarajan M Tallam, Germantown, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 9 days.

(21) Appl. No.: 16/019,222

(22) Filed: Jun. 26, 2018

(65) Prior Publication Data

US 2019/0393822 A1    Dec. 26, 2019

(51) Int. Cl.
*H02P 27/08*    (2006.01)
*H02K 11/27*    (2016.01)

(52) U.S. Cl.
CPC .............. *H02P 27/08* (2013.01); *H02K 11/27* (2016.01)

(58) Field of Classification Search
CPC ...... H02P 1/00; H02P 1/04; H02P 1/46; H02P 1/18; H02P 1/16; H02P 1/24; H02P 1/26; H02P 1/30; H02P 1/423; H02P 23/00; H02P 27/00; H02P 27/04; H02P 27/06; H02P 21/00; H02P 27/08; H02M 3/24; H02M 1/083; G05B 11/28
USPC ......... 318/400.01, 400.03, 400.14, 700, 701, 318/727, 800, 801, 599, 811; 307/11, 27, 307/40, 98, 103, 112, 129; 363/71
See application file for complete search history.

(56) References Cited

U.S. PATENT DOCUMENTS

| | | |
|---|---|---|
| 8,503,207 B2 | 8/2013 | Tallam et al. |
| 9,270,210 B2 | 2/2016 | Gries et al. |
| 9,374,021 B2 | 6/2016 | Tallam et al. |
| 2011/0089767 A1* | 4/2011 | Rocke ....................... H02J 3/01 307/102 |

OTHER PUBLICATIONS

Kerkman, R. et al., "Interaction of Drive Modulation & Cable Parameters on AC Motor Transients," Rockwell Automation-Allen Bradley Standard Drives Business, 1996, pp. 143-152.
Tallam, Rangarajan M. et al., "Control of PWM voltage source inverter in the pulse dropping region to reduce reflected wave motor over-voltage," Rockwell Automation, Drives Business, 2011, pp. 3900-3905.
Xiong, Han et al., "Finite Element Analysis Modeling and Experimental Verification of Reflected Wave Phenomena in Variable Speed Machine Drive Cables," 2017 IEEE International Electric Machines and Drives Conference (IEMDC), Miami, FL, May 21-24, 2017, pp. 1-8.

* cited by examiner

*Primary Examiner* — Antony M Paul
(74) *Attorney, Agent, or Firm* — Fletcher Yoder P.C.

(57) ABSTRACT

A motor drive system includes at least one current sensor disposed within a housing of the motor drive system. The at least one sensor is configured to detect a current of output power produced by the motor drive system. The motor drive system also includes a controller configured to determine a resonant frequency of a cable connected to the motor drive system based at least in part on the detected current, and to adjust pulse width modulation (PWM) switching of the motor drive system based at least in part on the determined resonant frequency of the cable.

21 Claims, 14 Drawing Sheets

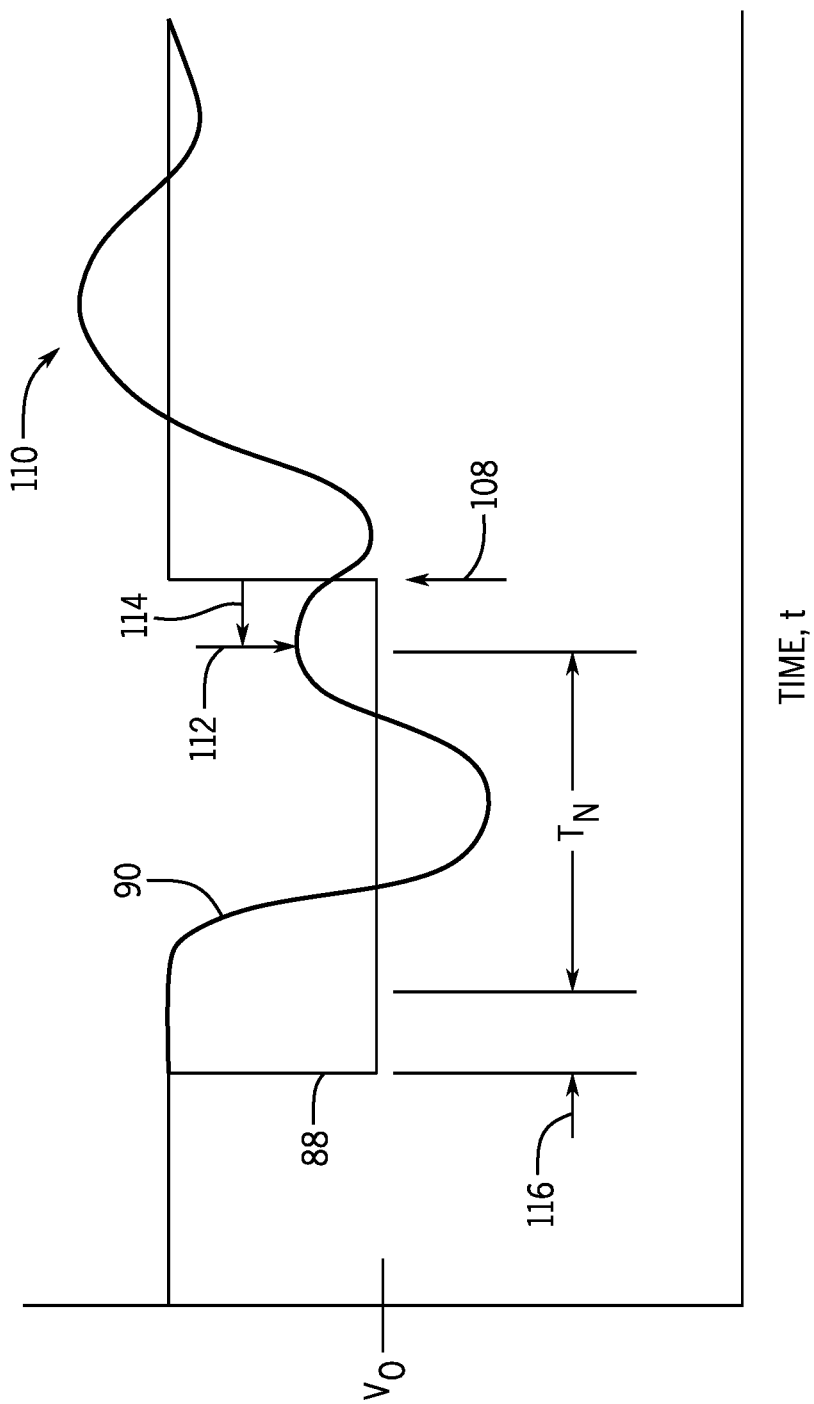

10,644,635 B2

SYSTEMS AND METHODS FOR MOTOR DRIVE CABLE CHARACTERISTICS IDENTIFICATION AND COMPENSATION THEREFOR

BACKGROUND

The present disclosure relates generally to the field of electrical power conversion systems. More particularly, the present disclosure relates to techniques for compensating for physical characteristics of cable connecting motor drives systems to loads to which the motor drive systems provide electrical power.

In the field of electrical power conversion systems, a wide range of circuitry is known and currently available for converting, producing, and applying power to loads. Depending upon the application, motor drive systems may include circuitry that converts incoming power from one form to another as needed by the load. In a typical drive system, for example, rectifier circuitry converts alternating current (AC) power (such as from a utility grid or generator) to direct current (DC) power. Inverter circuitry can then convert the DC signal into an AC signal of a particular frequency desired for driving a motor at a particular speed. The rectifier circuitry and the inverter circuitry typically include several high power switches, such as insulated-gate bipolar transistors (IGBTs), controlled by drive circuitry. Motor drive systems also often include power conditioning circuitry, including capacitors and/or inductors, which may further condition the power (e.g., removing undesirable ripple currents on a DC bus).

Sometimes, the length of a cable connecting the motor drive system to the particular load(s) may cause the power delivered to the load(s) to be different than the power delivered from the motor drive system. For example, the length of the cable may generate high motor line-to-line transient peak voltage due to what is referred to as the reflected wave phenomenon, which may cause insulation breakdown in the motor drive system and/or the cable.

BRIEF DESCRIPTION

In one embodiment, a motor drive system includes at least one current sensor disposed within a housing of the motor drive system. The at least one sensor is configured to detect a current of output power produced by the motor drive system. The motor drive system also includes a controller configured to determine a resonant frequency of a cable connected to the motor drive system based at least in part on the detected current.

In another embodiment, a method includes detecting, via at least one current sensor of a motor drive system, a current of output power produced by the motor drive system. The method also includes determining, via a controller of the motor drive system, a resonant frequency of a cable connected to the motor drive system based at least in part on the detected current.

In another embodiment, a method includes detecting, via at least one current sensor of a motor drive system, a current of output power produced by the motor drive system. The method also includes determining, via a controller of the motor drive system, a resonant frequency of a cable connected to the motor drive system based at least in part on the detected current. The method further includes adjusting, via the controller of the motor drive system, pulse width modulation (PWM) switching of the motor drive system based at least in part on the determined resonant frequency of the cable.

DRAWINGS

These and other features, aspects, and advantages of the present invention will become better understood when the following detailed description is read with reference to the accompanying drawings in which like characters represent like parts throughout the drawings, wherein:

FIG. 8 illustrates an example of reflected wave compensation that may be implemented by the controller, in accordance with an embodiment;

DETAILED DESCRIPTION

Figure 1:
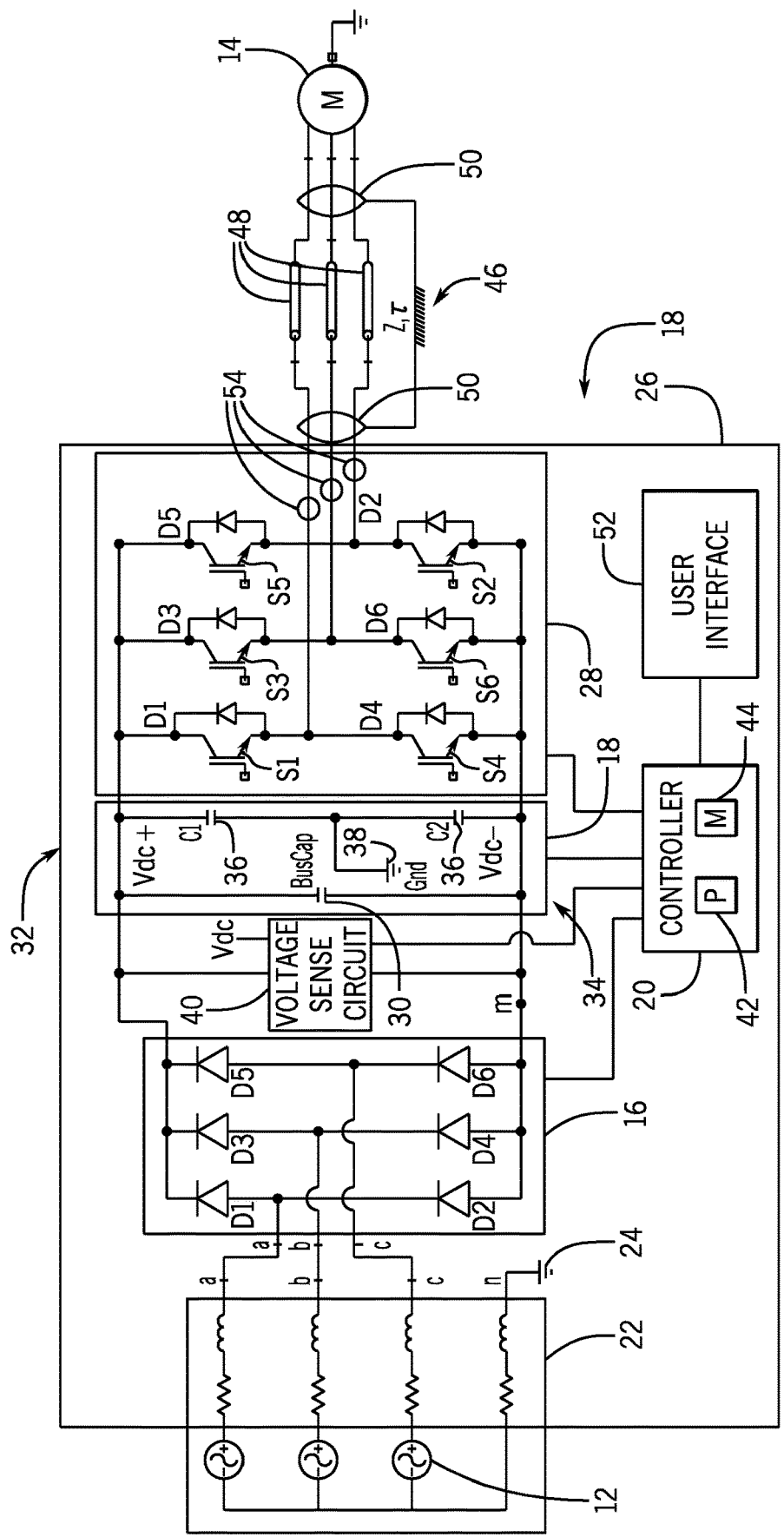
FIG. 1 is a schematic diagram of an electrical power conversion system, in accordance with an embodiment.

FIG. 1 illustrates a power conversion system 10 (e.g., a motor drive system) configured to receive AC input power from an AC power source 12 (e.g., utility grid or generator) and provide AC output power to drive a load 14 (e.g., a motor). The power conversion system 10 includes a rectifier circuit 16 configured to receive the AC input power from the AC power source 12 and to provide a DC output signal to a DC bus circuit 18. As illustrated, in certain embodiments, the rectifier circuit 16 may be a passive rectifier circuit that includes a plurality of diodes D1-D6 with D1, D3, and D5 providing the positive DC voltage ($V_{DC}+$) of the DC bus circuit 18 and D2, D4, and D6 providing the negative DC voltage ($V_{DC}-$) of the DC bus circuit 18. However, in other embodiments, the rectifier circuit 16 may instead include active switching devices that may be operated according to control signals from a controller 20 that is configured to control the operation of the various circuitry of the power conversion system 10. As illustrated, in certain embodiments, the power conversion system 10 may include a filter circuit 22 connected between the AC power source 12 and the rectifier circuit 16. For example, as illustrated, the filter circuit 22 may connect the phase lines of the AC power source 12 and the AC input of the rectifier circuit 16. In other embodiments, the filter circuit 22 may be omitted.

As illustrated, the AC power source 12 is referenced to a ground reference node 24. The ground reference node 24 may be, for example, coupled with a neutral node of a Y-connected AC power source 12 through a high resistance ground (HRG) resistor, where the AC power source 12 may, in certain embodiments, include a transformer with a Y-connected primary or secondary including a neutral node to form the ground reference node 24 for the power conversion system 10. In certain embodiments, the ground reference node 24 may be connected to a housing or enclosure 26 (e.g., schematically depicted by the dashed line in FIG. 1) of the power conversion system 10, which houses the various circuitry of the power conversion system 10. In certain embodiments, the controller 20 may also be disposed within the housing 26.

As illustrated, the power conversion system 10 also includes an inverter circuit 28 configured to receive DC input power from the DC bus circuit 18 and to provide AC output power to drive the load 14. As illustrated, in certain embodiments, the inverter circuit 28 may include a plurality of switching devices S1-S6 configured to operate according to control signals received from the controller 20. In certain embodiments, a transformer circuit and/or output filter circuit (not shown) may be connected between the output of the inverter circuit 28 and the load 14.

As illustrated, in certain embodiments, the DC bus circuit 18 may include a main bus capacitor 30 connected between a positive DC bus terminal 32 and a negative DC bus terminal 34. In addition, as also illustrated, in certain embodiments, the DC bus circuit 18 may include two secondary bus capacitors 36 connected between the positive DC bus terminal 32 and the negative DC bus terminal 34 in parallel with the main bus capacitor 30 and separated by a ground reference node 38. In addition, in certain embodiments, a voltage sensing circuit 40 may be connected between the positive DC bus terminal 32 and the negative DC bus terminal 34 in parallel with the DC bus circuit 18, the rectifier circuit 16, and the inverter circuit 28.

In operation, the DC output of the rectifier circuit 16 provides a controlled DC output voltage $V_{DC}$ to the DC bus circuit 18, which is provided to the DC input of the inverter circuit 28. As discussed above, in certain embodiments, the rectifier circuit 16 may be a passive rectifier circuit, as illustrated, or may be an active rectifier circuit with a plurality of active switching devices. As illustrated, in certain embodiments, the inverter circuit 28 may include a plurality of switching devices S1-S6 individually coupled between a corresponding one of the DC bus terminals 32, 34 and a corresponding one of the AC output lines. In operation, the controller 20 sends control signals to the inverter circuit 28, causing the inverter circuit 28 to selectively activate the inverter switching devices S1-S6 in order to convert DC input power from the DC bus circuit 18 to provide variable frequency, variable amplitude AC output voltages and corresponding currents to drive the load 14. Although illustrated and described herein in connection with a motor drive system, the embodiments of the present disclosure may be applied in other power conversion systems 10 that provide electrical power to loads 14.

In certain embodiments, the controller 20 may be a programmable logic controller (PLC) that locally (or remotely) controls operation of the various circuitry of the power conversion system 10. For example, the controller 20 may instruct the inverter circuit 28 regarding switching of the inverter switching devices S1-S6. Accordingly, in certain embodiments, the controller 20 may include one or more processor 42 and memory 44. More specifically, the memory 44 may be a tangible non-transitory computer-readable medium on which instructions are stored. As will be described herein, the computer-readable instructions may be configured to perform various processes described when executed by the one or more processor 42. In certain embodiments, the controller 20 may also be included within the circuitry of the power conversion system 10.

As illustrated, the power conversion system 10 is connected to the load 14 via a cable 46, which may include a bundle of three cable lines 48, with each cable line 48 providing a respective phase of the AC output power from the inverter circuit 28 to the load 14. A cable shield 50 of the cable 46 may protect the cable lines 48 and provide a cable ground. As described herein, the length of the cable 46 may lead to situations where the AC power provided to the load 14 is significantly different than the AC power output by the inverter circuit 28. For example, relatively long cables 46 may generate relatively high line-to-line transient peak voltages due to what is referred to as the reflected wave phenomenon, which may cause insulation breakdown in the load (e.g., motor) 14 and/or the cable 46.

The embodiments described herein enable the power conversion system 10 to compensate for the length, as well as other physical characteristics, of the cable 46 to ensure that the AC power provided to the load 14 is as expected. For example, in certain embodiments, the power conversion system 10 may auto-detect the physical characteristics of the cable 46 (e.g., during a start-up phase) or otherwise know the physical characteristics of the cable 46. With this information, as described in greater detail herein, the controller 20 of the power conversion system 10 may estimate a resonant frequency of the particular cable 46. Then, as also described in greater detail herein, the controller 20 may apply reflected wave compensation to the pulse width modulated (PWM) waveforms generated, for example, by the inverter circuit 28 using the estimated resonant frequency of the cable 46, with minimum distortion. In addition, in certain embodiments, the power conversion system 10 may be capable of determining when significant differences in cable characteristics are introduced (e.g., when a new cable 46 is connected to the power conversion system 10), such as significant deviations from characteristics of well-known cable geometries. In certain embodiments, when such significant differences are determined, the power conversion system 10 may warn the user by, for example, displaying a flashing alert on a user interface 52 of the power conversion system 10, generating an audible alert, and so forth.

As illustrated, in certain embodiments, each of three lines corresponding to the three phases of the AC output power from the inverter circuit 28 may include current sensors 54 that are configured to measure the current of the respective AC output phase. The embodiments described herein utilize the current measurements from the current sensors 54 to compensate for the reflected wave phenomenon caused by the cable 46. As described herein, in certain embodiments, during a startup phase for the power conversion system 10, the lower switching devices S2, S4, and S6 of the inverter circuit 28 may be pulsed ON. Then, for example, the switching device S2 is turned OFF, the switching device S1 is turned ON, and the three output currents are measured by the current sensors 54. In certain embodiments, this process may be repeated for each pair of switching devices (e.g., S1 and S2, then S3 and S4, and then S5 and S6). In addition, in certain embodiments, an auto-tuning procedure as described herein may be performed during this startup phase. During this startup phase, all fault protection is enabled, particularly instantaneous over-current (IOC). In certain embodiments, the duration of the ON pulse may be limited to less than approximately 10 microseconds.

Figure 2A:
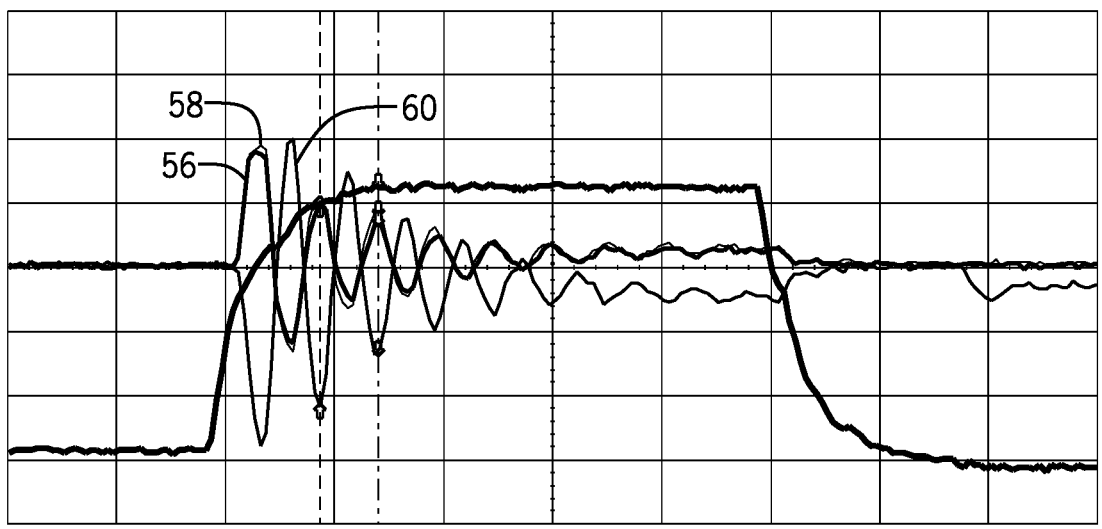
FIG. 2A illustrates three time series that relate to three output currents measured by three current sensors that correspond to three phases of AC output power for a particular cable, in accordance with an embodiment.
Figure 2B:
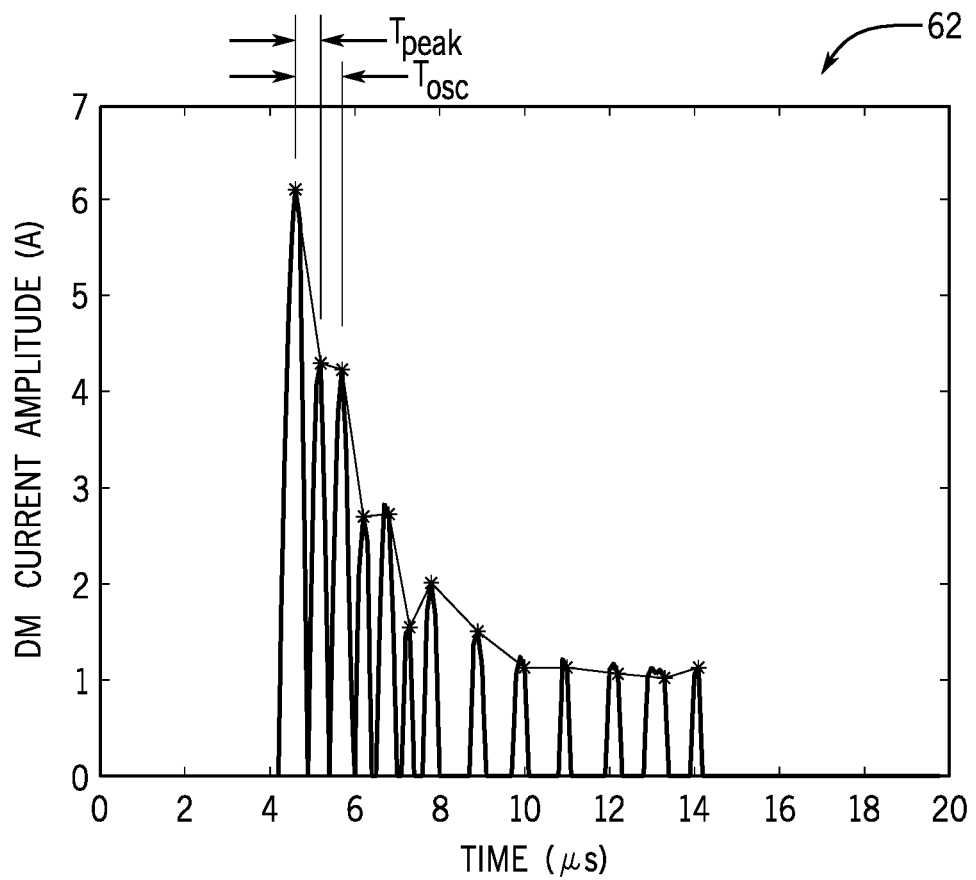
FIG. 2B is a plot of DM current amplitude (A) over time relating to the three time series illustrated in FIG. 2A, in accordance with an embodiment.

During this process of transitioning between switching each pair of switching devices (e.g., S1 and S2, then S3 and S4, and then S5 and S6), the current in any one phase is the sum of the differential mode (DM) components and the common mode (CM) components. Using the three measured output currents from the three current sensors 54 that correspond to the three phases, the DM and CM components may be determined by the controller 20. Then, using the determined DM and CM components, as well as the DC bus voltage $V_{DC}$, the DM and CM characteristic cable impedances $Z_{DM}$, $Z_{CM}$ may be determined by the controller 20 by, for example, using the equation:

$$I_{cable} = \frac{V_{DC}}{Z_{DM}} + \frac{1}{3}\frac{V_{DC}/3}{Z_{CM}} \quad \text{(Eq. 1)}$$

Where $I_{cable}$ is the current of the cable 46, $Z_{DM}$ is the differential mode impedance of the cable 46, and $Z_{CM}$ is the common mode impedance of the cable 46. For example, one non-limiting example of how the controller 20 may determine the DM and CM characteristic cable impedances $Z_{DM}$, $Z_{CM}$ is illustrated in FIGS. 2A and 2B. More specifically, FIG. 2A illustrates three time series 56, 58, 60 that relate to the three output currents measured by the three current sensors 54 that correspond to the three phases (e.g., the u-phase current $I_u$ 56, the v-phase current $I_v$ 58, and the w-phase current $I_w$ 60) of AC output power for a particular cable 46, and FIG. 2B is a plot 62 of the DM current amplitude (A) over time relating to the three time series 56, 58, 60 illustrated in FIG. 2A.

From the three output currents measured by the three current sensors 54 that correspond to the three phases, the controller 20 may calculate the DM and CM characteristic impedances $Z_{DM}$, $Z_{CM}$ of the cable 46. For example, the measured DM component of the current may first be rectified, as illustrated in FIG. 2B. Then, the controller 20 may identify the first peak (e.g., a magnitude and time relative to a start of a pulse), and then repeat for all of the subsequent peaks illustrated in FIG. 2B. The controller 20 may then determine an average time between adjacent peaks in order to determine an estimate of the peak period $T_{peak}$. Using the peak period $T_{peak}$, the controller 20 may then determine the oscillation period $T_{osc}$ and oscillation frequency $F_{osc}$, for example, using the following equations:

$$T\text{osc} = 2*T\text{peak} \quad \text{(Eq. 2)}$$

$$F\text{osc} = 1/T\text{osc or } F\text{osc} = 1/(2*T\text{peak}) \quad \text{(Eq. 3)}$$

The controller 20 may then determine the differential mode impedance $Z_{DM}$ of the cable 46 based on the measured DC bus voltage $V_{DC}$ and the magnitude of the first current peak, for example, using Equation 1 above. This process may then be repeated for the measured CM component of the current.

Figure 3A:
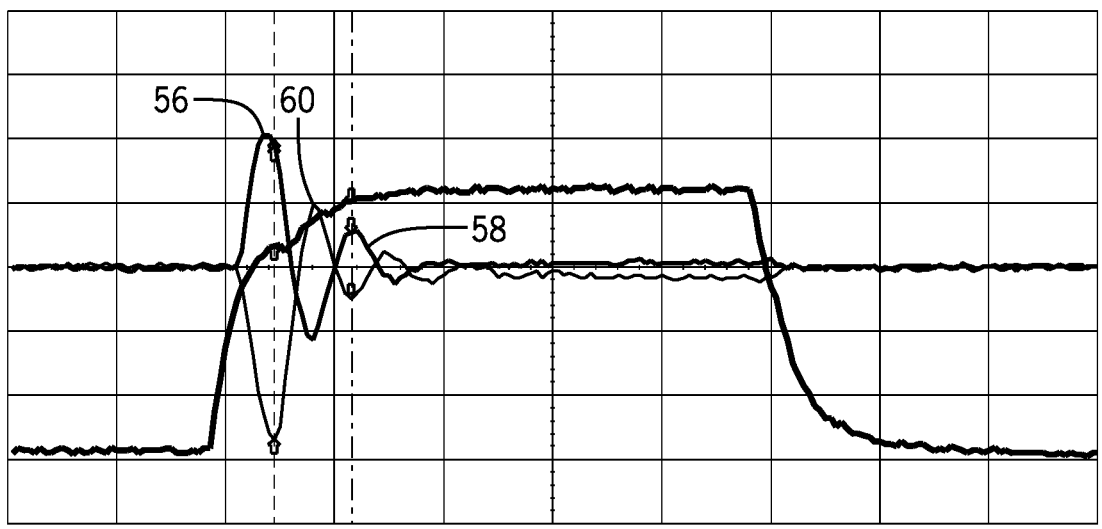
FIG. 3A illustrates three time series that relate to three output currents measured by three current sensors that correspond to three phases of AC output power for a relatively high capacitance cable, in accordance with an embodiment.
Figure 3B:
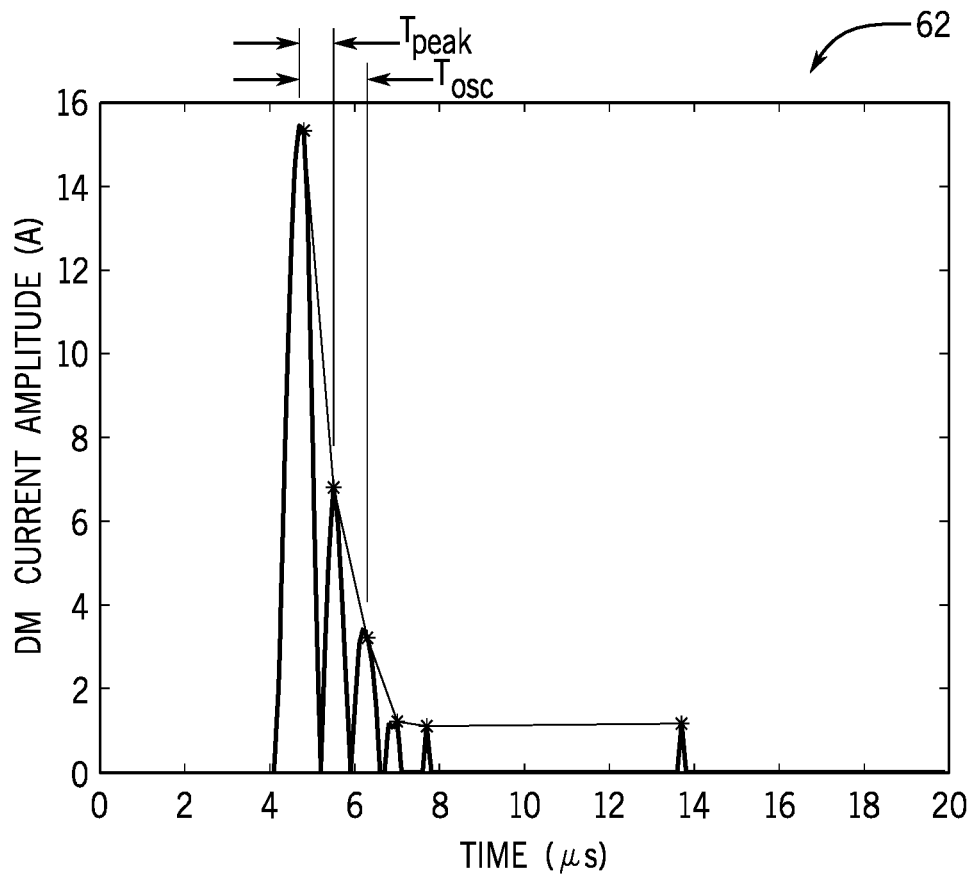
FIG. 3B is a plot of DM current amplitude (A) over time relating to the three time series illustrated in FIG. 3A, in accordance with an embodiment.

FIGS. 2A and 2B illustrate exemplary time series and calculated values for a relatively common cable 46 (e.g., a 50 meter standard 4-conductor shielded motor cable). By way of comparison, FIG. 3A illustrates three time series 56, 58, 60 that relate to the three output currents measured by the three current sensors 54 that correspond to the three phases (e.g., the u-phase current $I_u$ 56, the v-phase current $I_v$ 58, and the w-phase current $I_w$ 60) of AC output power for a relatively high capacitance meter cable 46 (e.g., a relatively high capacitance 50-meter 4-conductor shielded motor cable), for example, and FIG. 3B is a plot 62 of the DM current amplitude (A) over time relating to the three time series 56, 58, 60 illustrated in FIG. 3A. As illustrated, the relatively high capacitance 50-meter cable 46 of FIGS. 3A and 3B has relatively higher current peaks and more time between peaks and, thus, has a lower oscillation frequency $F_{osc}$ than the standard 50-meter cable 46 of FIGS. 2A and 2B.

Figure 4:
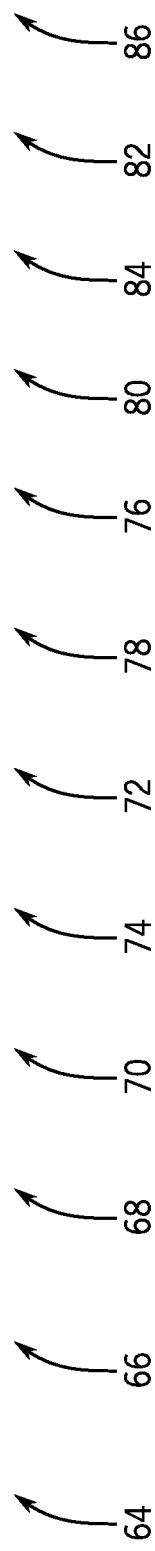
FIG. 4 is a chart of values for various calculated and measured characteristics of various cables to illustrate calculations that may be performed by a controller, in accordance with an embodiment.

FIG. 4 is a chart of values for various calculated and measured characteristics of various cables 46 to illustrate the calculations that may be performed by the controller 20, as described above. In particular, FIG. 4 shows various calculated and measured characteristics for exemplary cables 46 of various cable types 64 and lengths 66. For each cable 46, the peak experimental current 68 is shown (e.g., as determined by the controller 20 based on the output currents measured by the current sensors 54 and sampled at 10 megasamples per second, for example). As described above, the controller 20 may determine the experimental ring frequency 70 based on the peak experimental current 68. Similarly, the controller 20 may determine the experimental DM ring frequency 72 based on the peak experimental DM current 74, and the controller 20 may determine the experimental CM ring frequency 76 based on the peak experimental CM current 78. Using the calculated values for the peak experimental DM current 74 and the peak experimental CM current 78, the controller 20 may determine the experimental DM characteristic impedance $Z_{DM}$ 80 and the experimental CM characteristic impedance $Z_{CM}$ 82 for each cable 46.

In addition, FIG. 4 shows measured DM characteristic impedance $Z_{DM}$ 84 and measured characteristic impedance $Z_{CM}$ 86 for each cable 46, for example, as measured using an LCR meter (e.g., at 100 kHz). As illustrated, in general, there is a relatively high degree of correlation between the experimental characteristic impedances $Z_{DM}$, $Z_{CM}$ 80, 82 and the measured characteristic impedances $Z_{DM}$, $Z_{CM}$ 84, 86. However, it is noted that the degree of correlation for cables 46 of relatively average length 66 (e.g., 50-meter cables 46), for both standard and relatively non-standard cable construction, is somewhat closer than for cables 46 of relatively shorter length for which resonant frequencies cannot be detected as easily, since oscillations in the current measurement are relatively short in magnitude. For these reasons, as described in greater detail below, in addition to estimating characteristic impedances $Z_{DM}$, $Z_{CM}$ for cables 46, the embodiments described herein may also be used to detect when non-standard cables 46 have been connected to the power conversion system 10 such that, for example, a user may be alerted to this fact, in case the user may not have intended to connect a non-standard cable 46. For example, the impedance for a cable 46 of standard construction is typically designed to be somewhere between 70-130 ohms. In contrast, the relatively smaller values for impedance (e.g., between 20-40 ohms, for example) for relatively high capacitance cables 46 may enable the controller 20 to identify the relatively high capacitance cables 46 as non-standard cables.

It is noted that the oscillation frequency $F_{osc}$ of the cable 46 connected to the power conversion system 10 may be determined by the controller 20 independent of any characteristics of the power conversion system 10. Rather, the embodiments described above enable the controller 20 to obtain the oscillation frequency $F_{osc}$ (and cable ringing frequency) of the cable 46 connected to the power conversion system 10. In addition, the embodiments described herein enable the controller 20 to auto-tune (e.g., without user intervention) the switching of the switching devices S1-S6 of the inverter circuit 28 such that the oscillation frequency $F_{osc}$ of the cable 46 connected to the power conversion system 10 is compensated for in the PWM waveforms that are generated by the power conversion system 10.

Figure 5A:
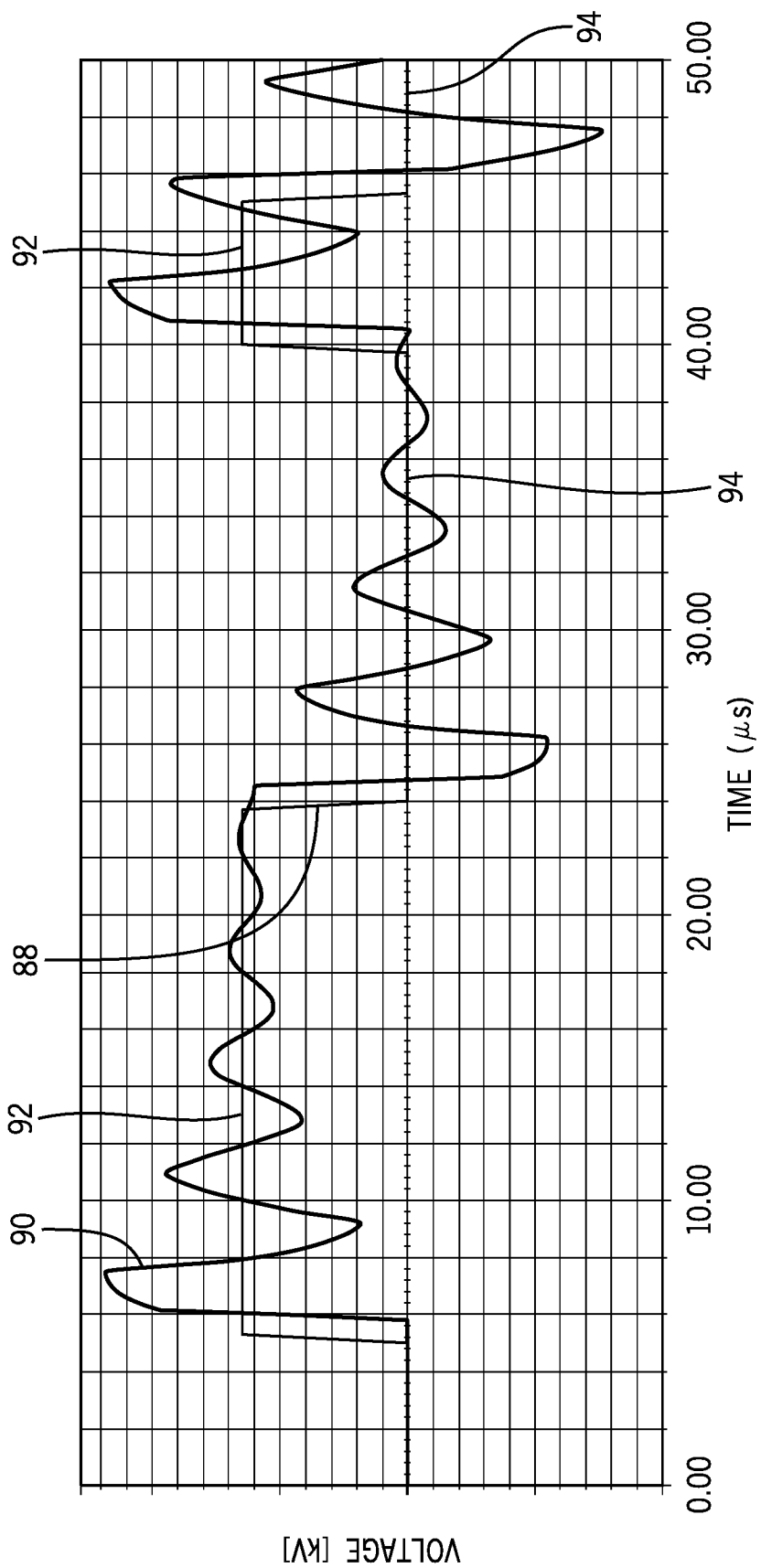
FIGS. 5A and 5B illustrate voltage time series of PWM switching signals versus the actual power supplied to a load for conventional power conversion systems.
Figure 5B:
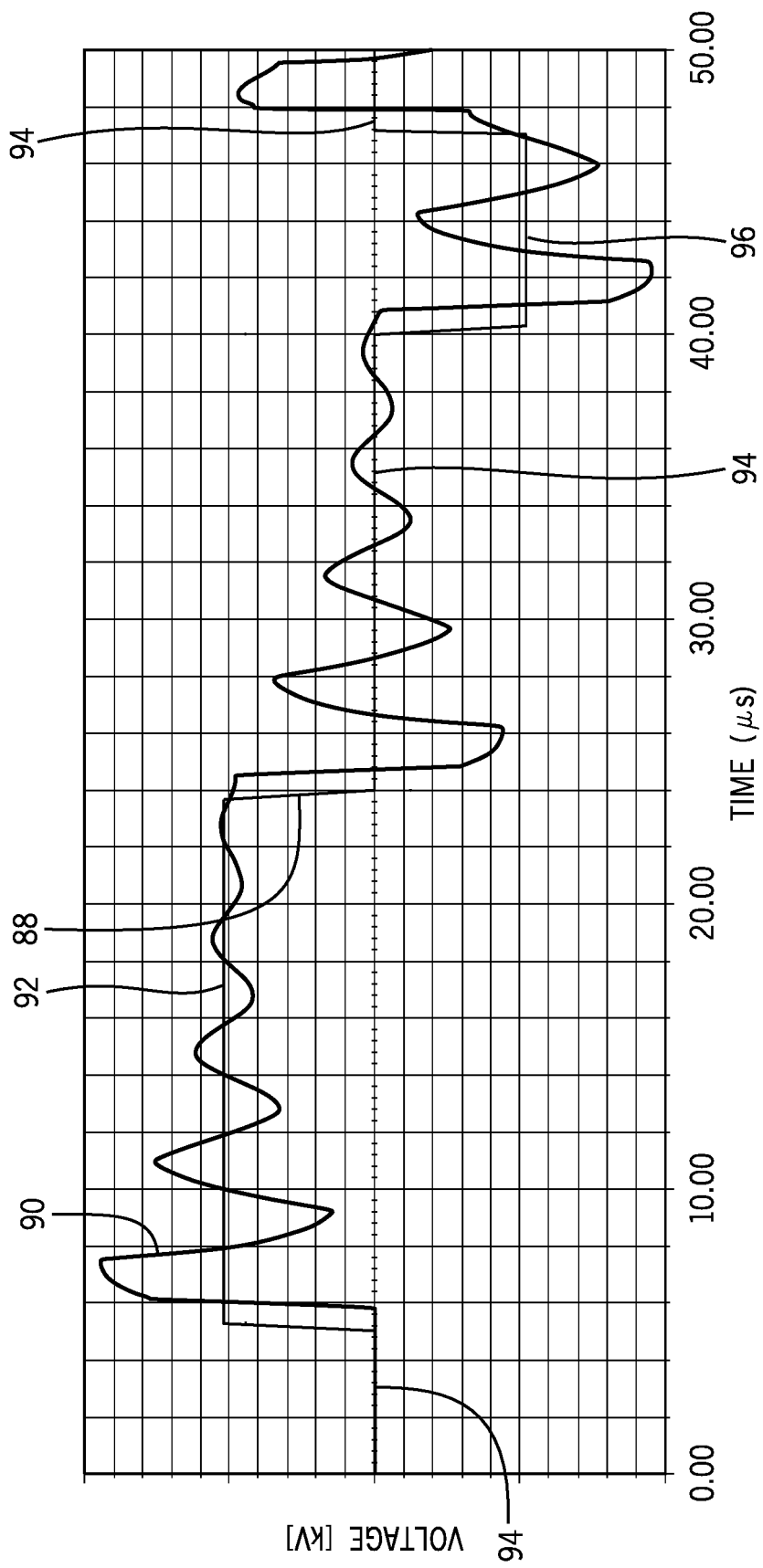

Conventional power conversion systems generally implement safeguards in their PWM algorithms (e.g., duty cycle limits, minimum dwell time enforcement, minimum polarity reversal times, and so forth) to allow cable ringing (e.g., as caused by the reflected wave phenomenon described above) to dampen between successive PWM pulses. In such conventional power conversion systems, the time required for the cable ringing to dampen may be in the range of 14-16 microseconds for frequencies up to 4 kHz. For example, FIGS. 5A and 5B illustrate voltage time series of PWM switching signals 88 (i.e., the carrier wave) versus the actual power 90 supplied to a load 14 for conventional power conversion systems. Specifically, FIG. 5A illustrates normal switching (e.g., between an ON state 92 and an OFF state 94), whereas FIG. 5B illustrates switching that includes polarity reversal of voltage (e.g., state 96). As illustrated in FIGS. 5A and 5B, the minimum dwell time (e.g., between pulse states) may be held close to 16 microseconds such that the cable ringing may dampen significantly before the next PWM pulse is applied. However, the minimum dwell time requirement used in conventional power conversion systems creates a significant amount of distortion in the output voltage. In addition, it will be appreciated that, at relatively high switching frequencies, the dwell time may become a significant portion of the PWM cycle, thus causing the distortion to become a significant problem, especially for relatively long cables.

In contrast, the embodiments described herein enable the controller 20 to use the oscillation frequency $F_{osc}$ of the cable 46, as determined in the manner described above, to auto-tune the switching of the switching devices S1-S6 of the inverter circuit 28 such that the time needed for the cable ringing to sufficiently dampen is significantly reduced as compared to conventional systems. For example, in certain embodiments, the dwell time between successive PWM pulses may be adjusted by the controller 20 in accordance with the determined cable signature of the cable 46, for example, to get a less than 2 p.u. overvoltage at the power output terminals of the power conversion system 10 with less voltage distortion than conventional systems.

Figure 6A:
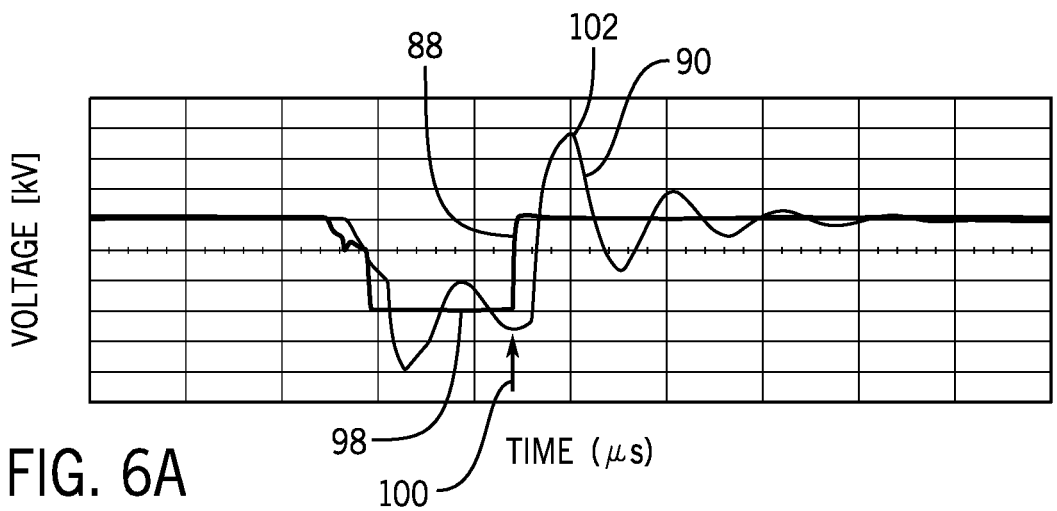
FIGS. 6A through 6C illustrate voltage time series of PWM switching signals versus the actual power supplied to a load for various test cases, in accordance with an embodiment.
Figure 6B:
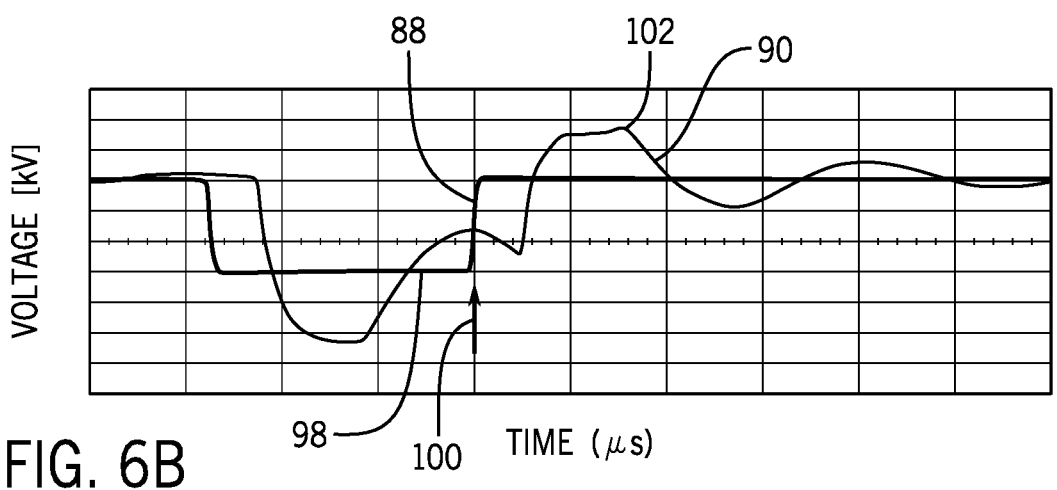
Figure 6C:
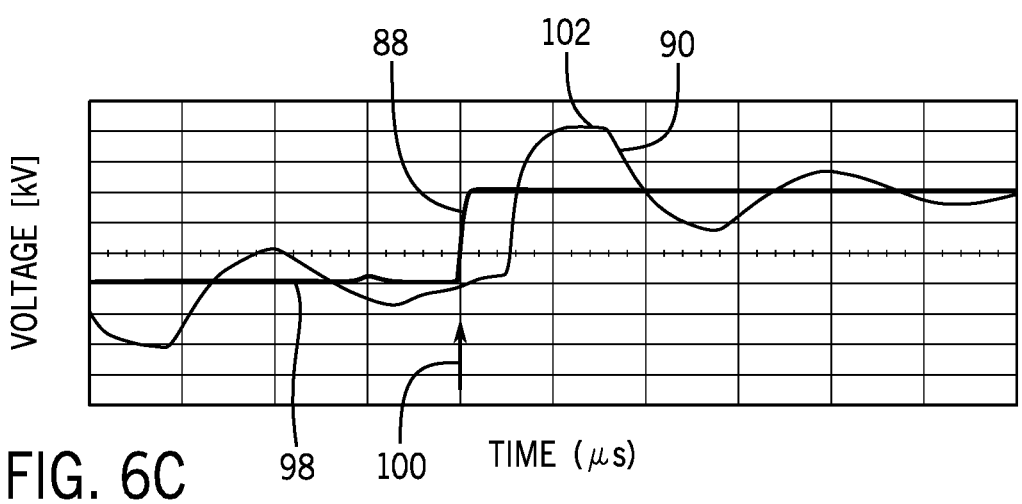

FIGS. 6A through 6C illustrate voltage time series of PWM switching signals 88 versus the actual power 90 supplied to a load 14 for various test cases for which the controller 20 may be used to auto-tune the switching of the switching devices S1-S6 of the inverter circuit 28 based at least in part on the calculated oscillation frequency $F_{osc}$ of the cable 46. For example, FIG. 6A illustrates an instance where the actual power 90 is under a lower peak 98 at a switching instant 100 where the next switching state is in a positive direction. As illustrated in FIG. 6A, in such an instance, the overvoltage peak 102 of the actual power 90 that occurs after the switching instant 100 may be relatively high (e.g., 1192 volts, or 1.95 p.u. in the illustrated test case). Conversely, FIG. 6B illustrates an instance where the actual power 90 is above a lower peak 98 at a switching instant 100 where the next switching state is in a positive direction. As illustrated in FIG. 6B, in such an instance, the overvoltage peak 102 of the actual power 90 that occurs after the switching instant 100 may be relatively low (e.g., 976 volts, or 1.60 p.u. in the illustrated test case). As an illustration of an intermediate case, FIG. 6C illustrates an instance where the actual power 90 is close to a zero crossing of a lower peak 98 at a switching instant 100 where the next switching state is in a positive direction. As illustrated in FIG. 6C, in such an instance, the overvoltage peak 102 of the actual power 90 that occurs after the switching instant 100 may be between the instances illustrated in FIGS. 6A and 6B (e.g., 1056 volts, or 1.74 p.u. in the illustrated test case).

Figure 7A:
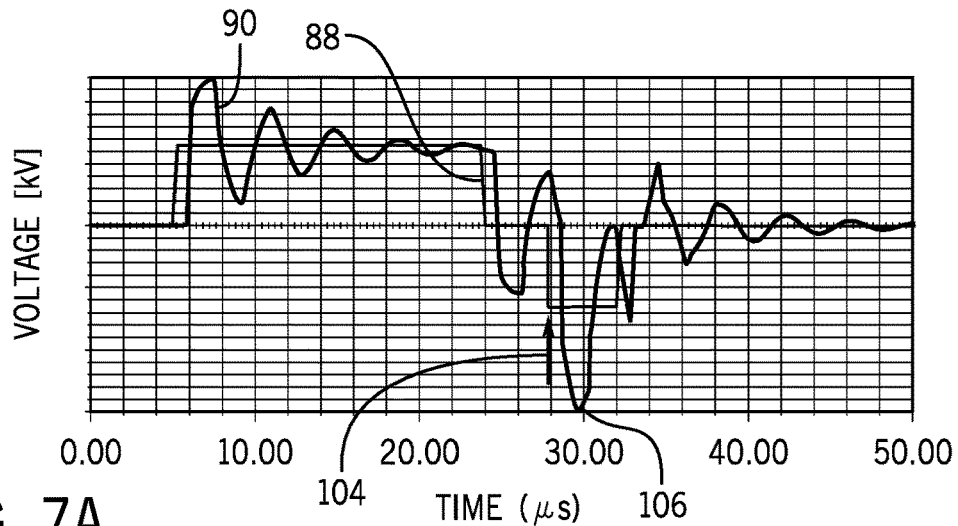
FIGS. 7A through 7C illustrate voltage time series of PWM switching signals versus the actual power supplied to a load for various other test cases that include polarity reversal, in accordance with an embodiment.
Figure 7B:
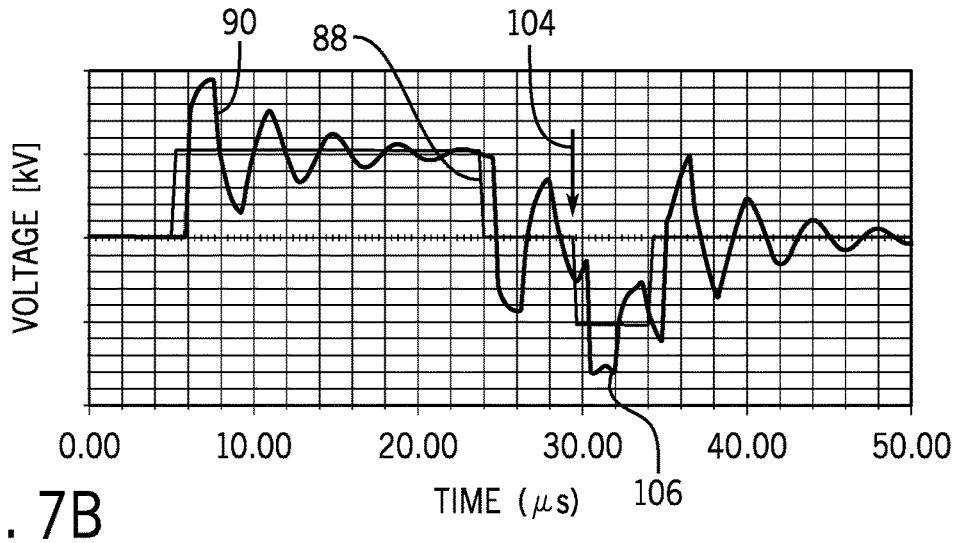
Figure 7C:
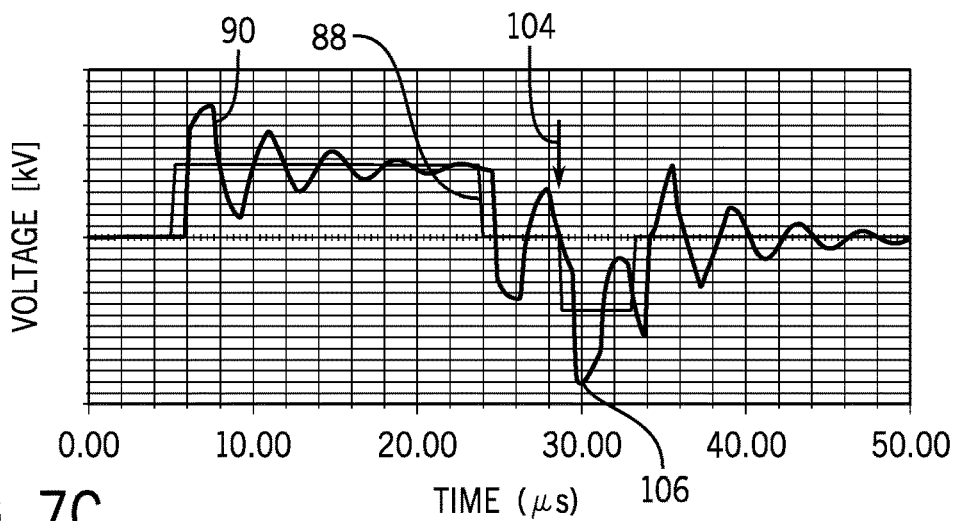

FIGS. 7A through 7C illustrate voltage time series of PWM switching signals 88 versus the actual power 90 supplied to a load 14 for various other test cases that include polarity reversal for which the controller 20 may be used to auto-tune the switching of the switching devices S1-S6 of the inverter circuit 28 based at least in part on the calculated oscillation frequency $F_{osc}$ of the cable 46. For example, FIG. 7A illustrates an instance where the actual power 90 is positive at a switching instant 104 where the polarity is switched from positive to negative. As illustrated in FIG. 7A, in such an instance, the negative overvoltage peak 106 of the actual power 90 that occurs after the switching instant 104 may be relatively high (e.g., negative 1481 volts, or 2.27 p.u. in the illustrated test case). Conversely, FIG. 7B illustrates an instance where the actual power 90 is negative at a switching instant 104 where the polarity is switched from positive to negative. As illustrated in FIG. 7B, in such an instance, the negative overvoltage peak 106 of the actual power 90 that occurs after the switching instant 104 may be relatively low (e.g., 1014 volts, or 1.56 p.u. in the illustrated test case). As an illustration of an intermediate case, FIG. 7C illustrates an instance where the actual power 90 is close to a zero crossing at a switching instant 104 where the polarity is switched from positive to negative. As illustrated in FIG. 7C, in such an instance, the negative overvoltage peak 106 of the actual power 90 that occurs after the switching instant 104 may be between the instances illustrated in FIGS. 7A and 7B (e.g., 1304 volts, or 2.00 p.u. in the illustrated test case).

As such, the instances illustrated in FIGS. 6A through 7C depict that, when the voltage of the actual power 90 at a particular switching state is below (i.e., the voltage of the actual power 90 is more negative than) the target voltage 88 for the particular switching state when the next switching state is in the positive direction (i.e., to switch the voltage to be more positive), the resulting positive overvoltage peak 102 will be greater than (i.e., more positive) when the voltage of the actual power 90 at a particular switching state is above (i.e., the voltage of the actual power 90 is more positive than) the target voltage 88 for the particular switching state when the next switching state is in the positive direction (i.e., to switch the voltage to be more positive). Conversely, when the voltage of the actual power 90 at a particular switching state is above (i.e., the voltage of the actual power 90 is more positive than) the target voltage 88 for the particular switching state when the next switching state is in the negative direction (i.e., to switch the voltage to be more negative), the resulting negative overvoltage peak 106 will be greater than (i.e., more negative) when the voltage of the actual power 90 at a particular switching state is below (i.e., the voltage of the actual power 90 is more negative than) the target voltage 88 for the particular switching state when the next switching state is in the negative direction (i.e., to switch the voltage to be more negative).

With this in mind, in certain embodiments, the controller 20 may use the calculated oscillation frequency $F_{osc}$ of the cable 46 to ensure that the voltage of the actual power 90 at a particular switching state is at or near a local positive peak value (i.e., the voltage of the actual power 90 is about to start decreasing after a period of increasing) above the target voltage 88 for the particular switching state when the next switching state is in the positive direction (i.e., to switch the voltage to be more positive), similar to the situation illustrated in FIG. 6B, or to ensure that the voltage of the actual power 90 at a particular switching state is at or near a local negative peak value (i.e., the voltage of the actual power 90 is about to start increasing after a period of decreasing) below the target voltage 88 for the particular switching state when the next switching state is in the negative direction (i.e., to switch the voltage to be more negative), similar to the situation illustrated in FIG. 7B. In other words, in certain embodiments, the controller 20 may ensure that the voltage of the actual power 90 at a particular switching state is at a local peak value in the same direction of the next switching state (e.g., is at a local positive peak value when the next switching state is in the positive direction, or is at a local negative peak value when the next switching state is in the negative direction). In doing so, the controller 20 may ensure that the resulting overvoltage peak is relatively small, thus leading to relatively shorter dwell times.

Specifically, the controller 20 may slightly adjust the timing of the switching from a current switching state to the next switching state based on when the voltage of the actual power 90 at the current switching state is at a local peak value in the same direction of the next switching state. FIG. 8 illustrates an example of the reflected wave compensation that may be implemented by the controller 20 based on the calculated oscillation frequency $F_{osc}$ of the cable 46. Specifically, FIG. 8 illustrates an instance similar to that illustrated in FIG. 6B, where the voltage of the actual power 90 is above a lower peak 98 at a switching instant 108 where the next switching state is in a positive direction. However, in such an instance, as discussed above, the overvoltage peak 110 may be reduced by the controller 20 by ensuring that the switching instant 108 occurs at or near a local positive peak value 112 of the voltage of the actual power 90. Specifically, in certain embodiments, the controller 20 may determine when a closest local peak value 112 for the voltage of the actual power 90 will occur with respect to the expected timing of the next switching instant 108, and may adjust the timing (either forward or backward in time), as illustrated by arrow 114.

It will be appreciated that the controller may make the prediction of when a closest local peak value 112 for the voltage of the actual power 90 will occur with respect to the expected timing of the next switching instant 108 based at least in part on the calculated oscillation frequency $F_{osc}$ of the cable 46. For example, the controller 20 will already know the timing of the next switching instant 108 based on the present PWM regime. Based on voltage feedback, the controller 20 may determine a time $T_N$ for N cycles (e.g., between a first local peak value and a closest local peak value), where $T_N = N/F_{osc}$, and may use $T_N$ to determine for which number of cycles N a local peak value 112 for the voltage of the actual power 90 occurs closest to the expected timing of the next switching instant 108. For example, N simply equals 1 in the illustrated example. However, it will be appreciated that any integer N number of cycles may be where a local peak value 112 for the voltage of the actual power 90 occurs closest to the expected timing of the next switching instant 108, in any given situation. It is noted that the adjustment of the timing of the switching may be referred to as modulation index adjustment, with N being the index. It will also be appreciated that, in certain circumstances (e.g., when polarity is reversed), N may not only include integers, but also half-integers.

It will be appreciated that adjusting each of the cycles in the manner illustrated in FIG. 8 may eventually lead to volt-second imbalances in the output voltage, which may cause a DC offset, if not compensated for. In certain embodiments, as described in greater detail below, such volt-second balance may be achieved by the controller 20 by accumulating the "error" (e.g., the integral difference between expected volt-seconds and actual volt-seconds), and then compensating for the error by modulation index adjustment in subsequent PWM cycles.

In addition, there are other additional physical phenomenon that will affect the manner in which the controller 20 may adjust the timing of the switching. For example, dead time in typical IGBT drives is about 1-2 microseconds. In certain embodiments, the controller 20 may compensate for the dead time on a pulse-by-pulse basis. To do so, the controller 20 needs to know the current polarity. However, at or near a zero crossing of current, where polarity of the current may not be correctly detected by the current sensors 54, dead time compensation may be relatively inaccurate and, thus, may adversely affect the reflected wave compensation described above (e.g., by either extending or shortening the pulse, thereby resulting in a greater than 2 p.u. overvoltage at the power output terminals of the power conversion system 10). As such, when the current is relatively high such that the polarity may be accurately determined by the controller 20, then the reflected wave compensation described above may be used. Conversely, when the current has a relatively low amplitude (e.g., in a band at or near zero), the dwell time may be set to a maximum value (e.g. between 14-16 microseconds), similar to the conventional techniques described above. In other words, in certain embodiments, the controller 20 may utilize a selective control scheme whereby the magnitude of the current measured by the current sensors 54 determines which of two control modes (e.g., the reflected wave compensation described above vs. normal switching according to the current PWM regime) may be used.

Furthermore, it will be appreciated that transmission delay through the cable 46 may be approximately equal to 0.25 times the oscillation period for a given cycle, as illustrated by arrow 116 in FIG. 8. The controller 20 may take this transmission delay 116 into account when determining when to adjust the timing of the switching instant 108 from the current switching state to the next switching state, in order to minimize the overvoltage.

Figure 9:
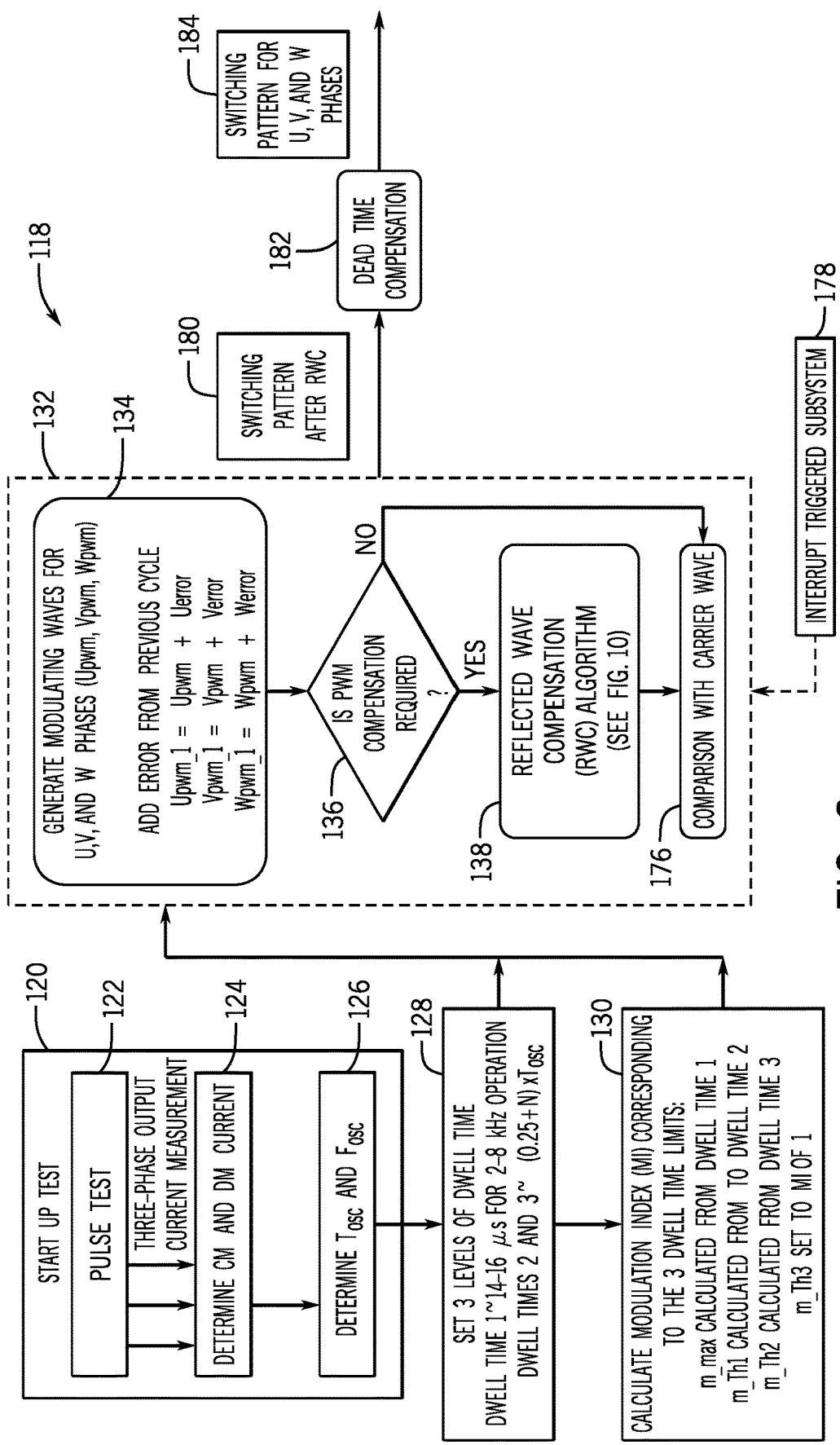
FIG. 9 is a flow chart of a process that may be implemented by the controller, in accordance with an embodiment.

FIG. 9 is a flow chart 118 of a process that may be implemented by the controller 20 in certain embodiments. As described above, in certain embodiments, a start-up test procedure 120 may be implemented by the controller 20, for example, when a new cable 46 is connected to the power conversion system 10, when the power conversion system 10 is turned on, and so forth. During the start-up test procedure 120, a pulse test 122 may be executed, as described above, whereby each pair of switching devices (e.g., S1 and S2, then S3 and S4, and then S5 and S6) is pulsed ON and OFF, respectively, in succession, and the three-phase output currents may be measured by the current sensors 54. Based on the measured three-phase output currents, the common mode current $I_{CM}$ and differential mode current $I_{DM}$ may be determined by the controller 20, as described above (step 124). Then, based on the determined common mode current $I_{CM}$ and differential mode current $I_{DM}$, the controller 20 may determine the oscillation period $T_{osc}$ and oscillation frequency $F_{osc}$ of the cable 46, as described above (step 126). For example, as described in greater detail above, the oscillation period $T_{osc}$ of the cable 46 may be determined as the average time of the separation of the peaks as illustrated in FIGS. 2B and 3B, for example.

Once the oscillation period $T_{osc}$ and oscillation frequency $F_{osc}$ of the cable 46 have been determined by the controller 20, the controller 20 may set certain levels of dwell time to be implemented (step 128). As described above, in certain embodiments, dwell time 1 may be set to approximately 14-16 microseconds for operation between 2-8 kHz. It will be appreciated that dwell time 1 is analogous to normal switching based on the current PWM regime, similar to conventional systems. The other dwell times (e.g., dwell time 2 and dwell time 3 in the illustrated example) may be set to approximately $(0.25 \times N) \times T_{osc}$, where N is an integer and the 0.25 value represents the transmission delay through the cable 46 being accounted for by the controller 20, as described above. The flow chart 118 illustrated in FIG. 9 suggests that three levels of dwell time may be set by the controller 20. However, it will be appreciated that any number of dwell times may be set by the controller 20 in certain embodiments. For example, in certain embodiments, instead of using two dwell times in addition to dwell time 1 (e.g., dwell time 2 and dwell time 3), three, four, five, or even more, additional dwell times may be set by the controller 20.

Next, the controller 20 may calculate a modulation index (MI) value corresponding to each of the dwell times (step 130). For example, in the illustrated embodiment, the controller 20 may calculate the MI as being $m_{max}$ relating to dwell time 1, may calculate MI as being a first threshold MI of $m_{Th1}$ relating to dwell time 2, may calculate MI as being a second threshold MI of $m_{Th2}$ relating to dwell time 3, and may set a third threshold MI of $m_{Th3}$, which may be equal to 1. As such, it will be appreciated that the magnitude of $m_{max}$ is less than $m_{Th1}$, which is less than $m_{Th2}$, which is less than $m_{Th3}$ (e.g., equal to 1), as described in greater detail with respect to FIG. 11.

Once the MIs corresponding to each of the dwell times have been calculated, the controller 20 may implement the main compensation module 132, during which control signals for switching the switching devices S1-S6 are generated based on the underlying PWM control regime to which the controller 20 is set. For example, in step 134, the controller 20 first generates modulating waves for the U, V, and W phases of the output power (e.g., having cycle periods of $U_{pwm}$, $V_{pwm}$, and $W_{pwm}$, respectively) based on the underlying PWM control regime. As described above, in certain embodiments, an error from the previous cycle may be added for each phase of the output power. For example, an adjusted cycle period $U_{pwm\_1}$ for the U phase may be set equal to $U_{pwm}+U_{error}$, an adjusted cycle period $V_{pwm\_1}$ for the V phase may be set equal to $V_{pwm}+V_{error}$, and an adjusted cycle period $W_{pwm\_1}$ for the W phase may be set equal to $W_{pwm}+W_{error}$.

Figure 10:
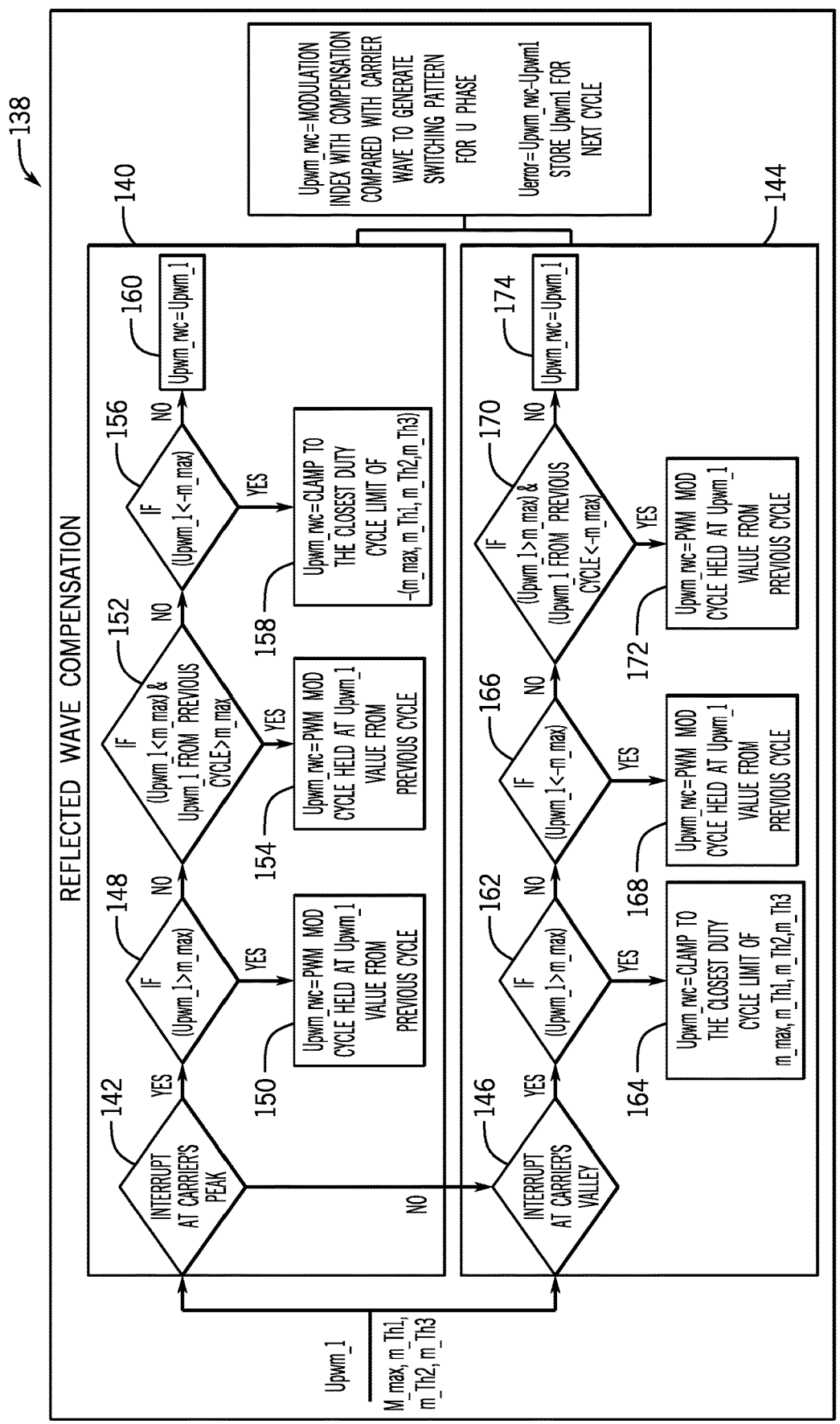
FIG. 10 is a flow chart of the reflected wave compensation algorithm, which may be implemented by the controller as part of the process of FIG. 9, in accordance with an embodiment.

Then, in decision block 136, the controller 20 may determine whether PWM compensation is required. For example, the controller 20 may determine where the voltage of the actual power is predicted to be relative to a commanded voltage at a next switching instant, as described above with respect to FIGS. 5 through 8. If the controller 20 determines that PWM compensation is required, in step 138, the controller 20 may implement a reflected wave compensation algorithm as described herein. For example, FIG. 10 is a flow chart of the reflected wave compensation (RWC) algorithm 138, which may be implemented by the controller 20 as part of the process 118 of FIG. 9. In FIG. 10, the algorithm is being performed by the controller 20 with respect to only one of the three phases (e.g., the U phase). However, the algorithm will be performed by the controller 20 with respect to the other two phases (e.g., the V and W phases) in a similar manner. As illustrated, the adjusted cycle period $U_{pwm\_1}$ for the U phase, as calculated in step 134, as well as the MIs ($m_{max}$ relating to dwell time 1, $m_{Th1}$ relating to dwell time 2, $m_{Th2}$ relating to dwell time 3, and $m_{Th3}=1$), as calculated in step 130, are used by the controller 20 to determine how to perform the reflected wave compensation for the U phase.

As illustrated in FIG. 10, in certain embodiments, the RWC algorithm 138 may include a first branch 140 that is implemented when the controller 20 determines that the next switching instant will interrupt at a peak of the carrier wave in decision block 142, and a second branch 144 that is implemented when the controller 20 instead determines that the next switching instant will interrupt at a valley of the carrier wave in decision block 146. In general, each of the branches compares the adjusted cycle period $U_{pwm\_1}$ for the U phase with the calculated MIs ($m_{max}$ relating to dwell time 1, $m_{Th1}$ relating to dwell time 2, $m_{Th2}$ relating to dwell time 3, and $m_{Th3}=1$) to determine how, or even if, to adjust the timing of the current cycle.

For example, in the first branch 140, the controller 20 may first determine if the adjusted cycle period $U_{pwm\_1}$ for the U phase is greater than $m_{max}$ in decision block 148. If the adjusted cycle period $U_{pwm\_1}$ for the U phase is greater than $m_{max}$, then the controller 20 holds the RWC cycle period $U_{pwm\_rwc}$ for the U phase equal to the adjusted cycle period $U_{pwm\_1}$ from the previous cycle for the U phase in step 150. In contrast, if the adjusted cycle period $U_{pwm\_1}$ for the U phase is not greater than $m_{max}$, the controller 20 may then determine if the adjusted cycle period $U_{pwm\_1}$ for the previous cycle of the U phase is greater than $m_{max}$ in decision block 152. If the adjusted cycle period $U_{pwm\_1}$ for the previous cycle of the U phase is greater than $m_{max}$, then the controller 20 holds the RWC cycle period $U_{pwm\_rwc}$ for the U phase equal to the adjusted cycle period $U_{pwm\_1}$ from the previous cycle for the U phase in step 154. In contrast, if the adjusted cycle period $U_{pwm\_1}$ for the previous cycle of the U phase is not greater than $m_{max}$, the controller 20 may then determine if the adjusted cycle period $U_{pwm\_1}$ for the U phase is less than $-m_{max}$ in decision block 156. If the adjusted cycle period $U_{pwm\_1}$ for the U phase is less than $-m_{max}$, then the controller 20 clamps the RWC cycle period $U_{pwm\_rwc}$ for the U phase to the closest duty cycle limit of $-(m_{max}, m_{Th1}, m_{Th2}, m_{Th3})$ in step 158. In contrast, if the adjusted cycle period $U_{pwm\_1}$ for the U phase is greater than $-m_{max}$, then the controller 20 sets the RWC cycle period $U_{pwm\_rwc}$ for the U phase equal to the adjusted cycle period $U_{pwm\_1}$ for the U phase in step 160.

Conversely, in the second branch 144, the controller 20 may first determine if the adjusted cycle period $U_{pwm\_1}$ for the U phase is greater than $m_{max}$ in decision block 162. If the adjusted cycle period $U_{pwm\_1}$ for the U phase is greater than $m_{max}$, then the controller 20 clamps the RWC cycle period $U_{pwm\_rwc}$ for the U phase to the closest duty cycle limit of ($m_{max}$, $m_{Th1}$, $m_{Th2}$, $m_{Th3}$) in step 164. In contrast, if the adjusted cycle period $U_{pwm\_1}$ for the U phase is not greater than $m_{max}$, the controller 20 may then determine if the adjusted cycle period $U_{pwm\_1}$ for the U phase is less than $-m_{max}$ in decision block 166. If the adjusted cycle period $U_{pwm\_1}$ for the U phase is less than $-m_{max}$, then the controller 20 holds the RWC cycle period $U_{pwm\_rwc}$ for the U phase equal to the adjusted cycle period $U_{pwm\_1}$ from the previous cycle for the U phase in step 168. In contrast, if the adjusted cycle period $U_{pwm\_1}$ for the U phase is not less than $-m_{max}$, the controller 20 may then determine if the adjusted cycle period $U_{pwm\_1}$ for the previous cycle of the U phase is less than $-m_{max}$ in decision block 170. If the adjusted cycle period $U_{pwm\_1}$ for the previous cycle of the U phase is less than $-m_{max}$, then the controller 20 holds the RWC cycle period $U_{pwm\_rwc}$ for the U phase equal to the adjusted cycle period $U_{pwm\_1}$ from the previous cycle for the U phase in step 172. In contrast, if the adjusted cycle period $U_{pwm\_1}$ for the previous cycle of the U phase is not less than $-m_{max}$, then the controller 20 sets the RWC cycle period $U_{pwm\_rwc}$ for the U phase equal to the adjusted cycle period $U_{pwm\_1}$ for the U phase in step 174.

As such, the RWC algorithm 138 illustrated in FIG. 10 is used to calculate the RWC cycle period $U_{pwm\_rwc}$ for the U phase, which represents an MI with compensation. The RWC cycle period $U_{pwm\_rwc}$ for the U phase may then be compared to the carrier wave by the controller 20 to generate an adjusted switching pattern for the U phase (see step 176 of FIG. 9). In addition, the controller 20 may set $U_{error}$ equal to the RWC cycle period $U_{pwm\_rwc}$ minus the adjusted cycle period $U_{pwm\_1}$, and may store $U_{error}$ and the adjusted cycle period $U_{pwm\_1}$ for the next cycle. It will be appreciated that the triggered subsystem may be interrupted in step 178 of FIG. 9 as the interrupt steps 142, 146 in FIG. 10. The result of the main compensation module 132 (and, specifically, the RWC algorithm 138) is an RWC switching pattern 180 for each of the three phases (e.g., U, V, and W) of the output power that may be implemented by the controller 20 by, for example, sending switching control signals to the switching devices S1-S6 according to the RWC switching pattern 180 for each of the three phases (e.g., U, V, and W) of the output power. Furthermore, as described above, the controller 20 may compensate for dead time on a pulse-by-pulse basis in step 182. The ultimate result of the process illustrated in FIG. 9 is an RWC switching pattern 184 for each of the three phases (e.g., U, V, and W) of the output power.

Figure 11A:
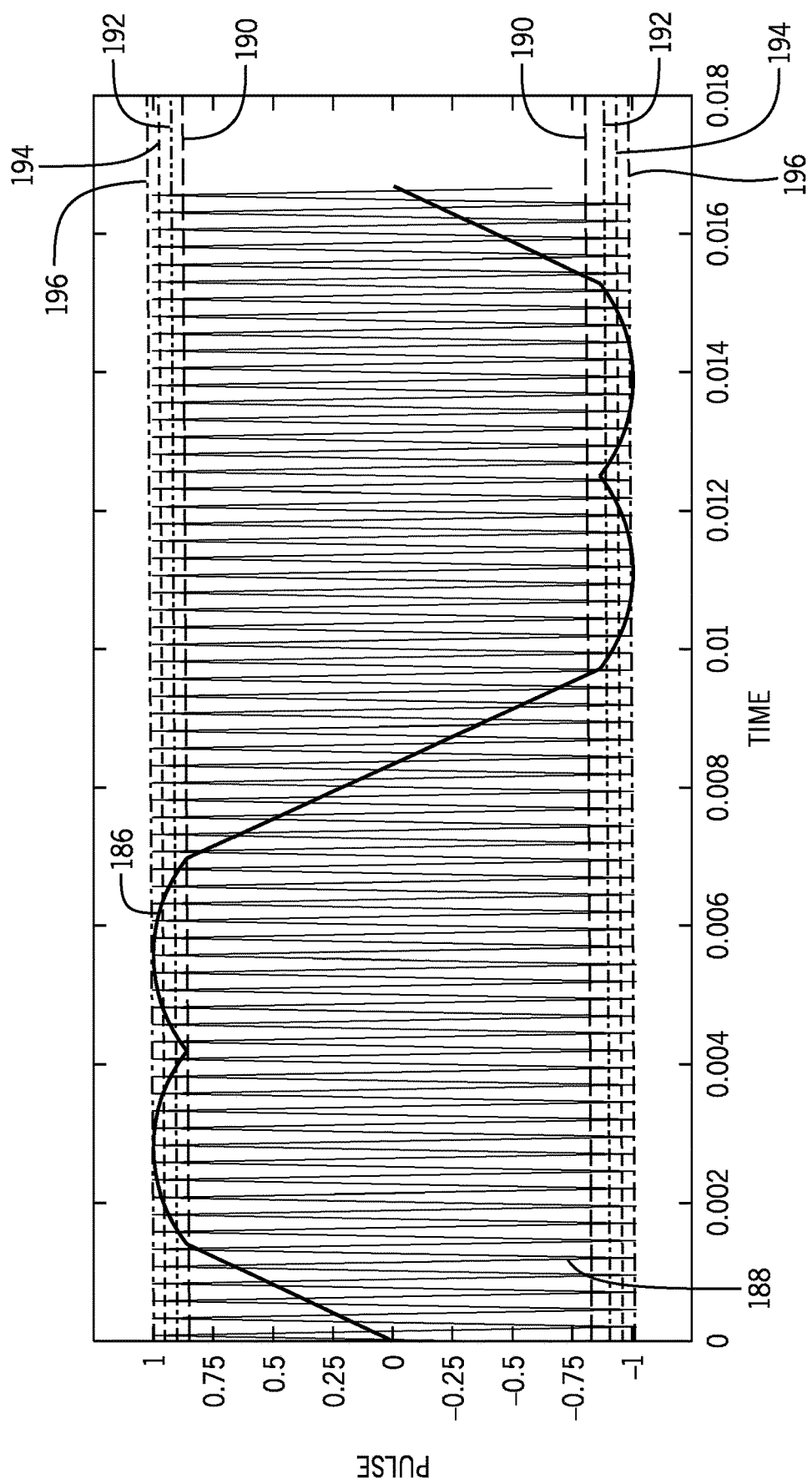
FIG. 11A illustrates a modulating wave and a triangular wave according to conventional sine vector PWM switching, and 11B illustrates a modulating wave and a triangular wave for PWM switching, in accordance with an embodiment.
Figure 11B:
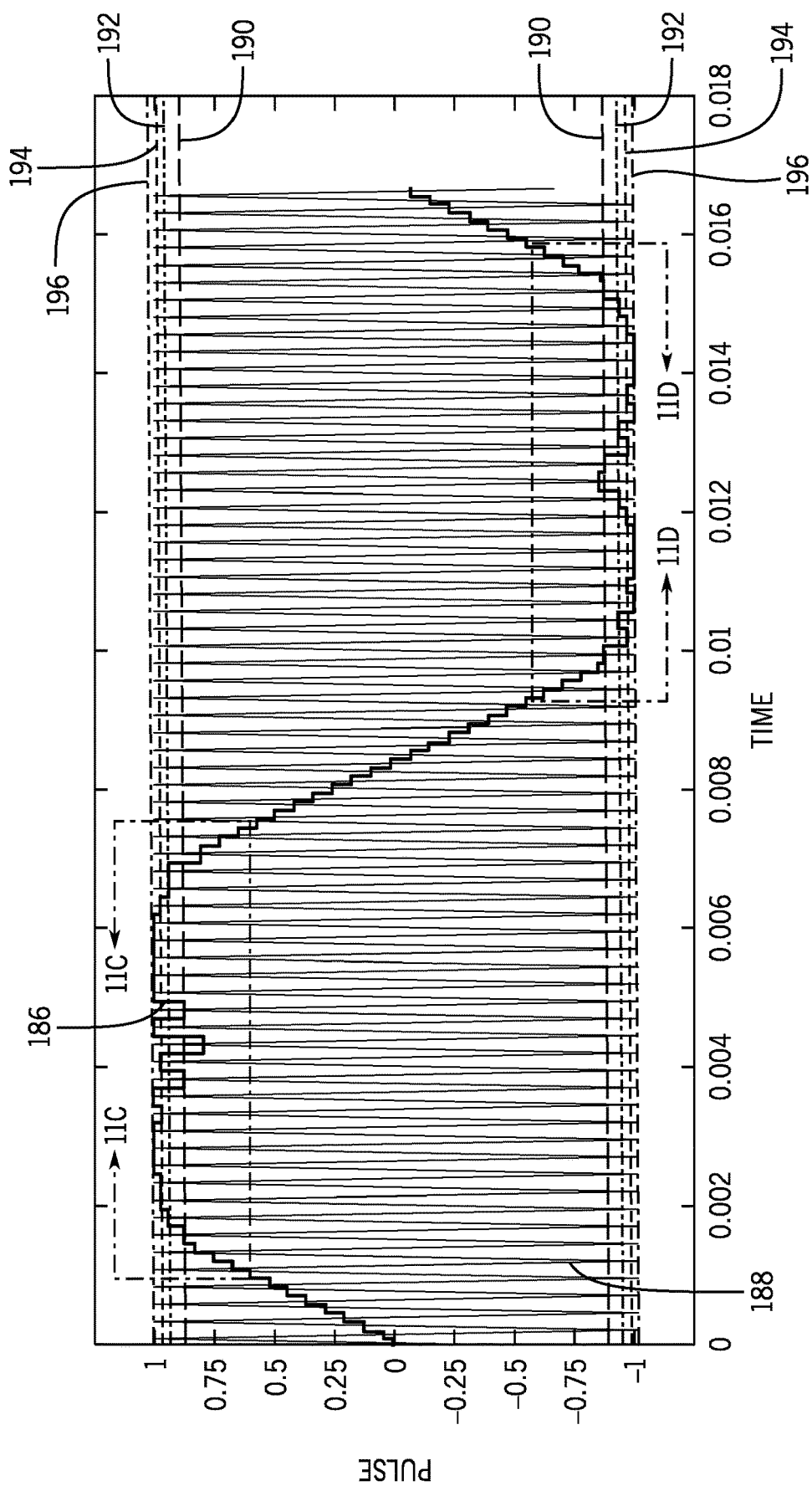
FIGS. 11C and 11D illustrate zoomed in views of FIG. 11B, in accordance with an embodiment.
Figure 11C:
Figure 11D:
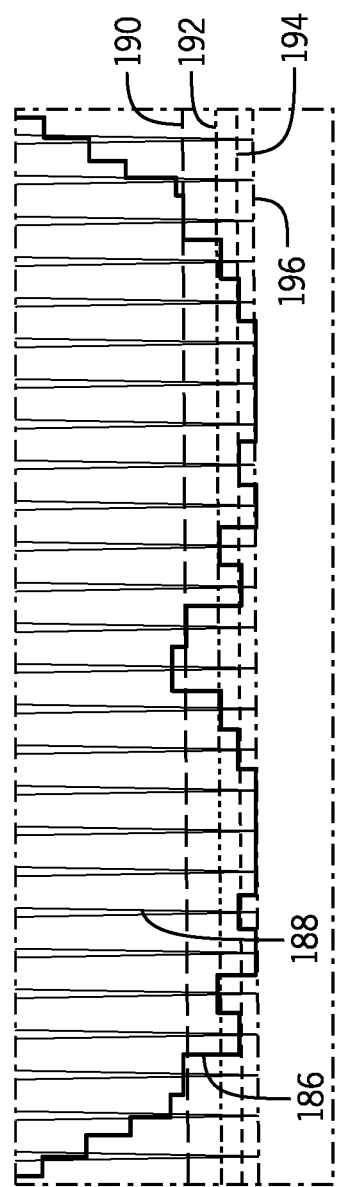

FIGS. 11A and 11B illustrate a modulating wave 186 and a triangular carrier wave 188 for PWM switching, and FIGS. 11C and 11D illustrate zoomed in views of FIG. 11B. In particular, FIG. 11A illustrates the modulating wave 186 and the triangular carrier wave 188 for a conventional sine vector PWM scheme, whereas FIG. 11B illustrates the modulating wave 186 and the triangular carrier wave 188 with the reflected wave compensation techniques described herein applied. More specifically, FIG. 11B illustrates how the various MIs ($m_{max}$ 190, $m_{Th1}$ 192, $m_{Th2}$ 194, $m_{Th3}$ 196) are used to adjust the modulating wave 186, as described in detail with respect to the RWC algorithm 138 illustrated in FIG. 10. FIGS. 11C and 11D provide a closer view of how the various MIs ($m_{max}$ 190, $m_{Th1}$ 192, $m_{Th2}$ 194, $m_{Th3}$ 196) may be used by the controller 20 to effect the timing of the PWM switching for each cycle. Again, as described in greater detail herein, although four MIs are being used in the illustrated embodiments, any number of MIs may be used in other embodiments.

The embodiments described herein enable reflected wave compensation at relatively high PWM frequencies. At standard PWM frequencies of 2-4 kHz, distortion will be reduced. At PWM frequencies of greater than 8 kHz, overvoltages of less than 2 p.u. may be obtained for relatively long cables. In addition, the embodiments described herein are applicable for newer power conversion systems, such as silicon carbide (SiC) power devices, that operate at relatively high PWM frequencies. In addition, if non-standard cables (e.g., high capacitance cables) are used, the detection techniques described herein may warn users of potential issues. In addition, the estimation of the cable physical characteristics are also useful for diagnostics. For example, in certain embodiments, cable charging current estimation may be used to correct for thermal manager calculations.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A motor drive system comprising:
   at least one current sensor disposed within a housing of the motor drive system, wherein the at least one current sensor is configured to detect a current of output power produced by the motor drive system; and
   a controller configured to determine a resonant frequency of a cable connected to the motor drive system based at least in part on the detected current, and to adjust pulse width modulation (PWM) switching of the motor drive system based at least in part on the determined resonant frequency of the cable.

2. The motor drive system of claim 1, wherein the controller is disposed within the housing of the motor drive system.

3. The motor drive system of claim 1, wherein the controller is configured to adjust the PWM switching of the motor drive system to compensate for transmission delay through the cable.

4. The motor drive system of claim 1, wherein the controller is configured to adjust the PWM switching of the motor drive system to compensate for dead time relating to the PWM switching.

5. The motor drive system of claim 1, wherein the controller is configured to determine a plurality of modulation index (MI) values based on the determined resonant frequency of the cable.

6. The motor drive system of claim 5, wherein the controller is configured to adjust the PWM switching of the motor drive system based on a comparison of a PWM carrier wave and the plurality of MI values for each cycle of the PWM carrier wave.

7. The motor drive system of claim 5, wherein the plurality of MI values comprises a first MI value corresponding to a frequency of a PWM carrier wave, a second MI value equal to 1, and a third MI value corresponding to the determined resonant frequency of the cable.

8. The motor drive system of claim 1, wherein the controller is configured to determine the resonant frequency of the cable during a start-up test of the motor drive system.

9. A method comprising:
   detecting, via at least one current sensor of a motor drive system, a current of output power produced by the motor drive system;
   determining, via a controller of the motor drive system, a resonant frequency of a cable connected to the motor drive system based at least in part on the detected current; and
   adjusting, via the controller of the motor drive system, pulse width modulation (PWM) switching of the motor drive system based at least in part on the determined resonant frequency of the cable to compensate for transmission delay through the cable.

10. The method of claim 9, comprising adjusting, via the controller of the motor drive system, the PWM switching of the motor drive system to compensate for dead time relating to the PWM switching.

11. The method of claim 9, comprising determining, via the controller of the motor drive system, a plurality of modulation index (MI) values based on the determined resonant frequency of the cable.

12. The method of claim 11, comprising adjusting, via the controller of the motor drive system, the PWM switching of the motor drive system based on a comparison of a PWM carrier wave and the plurality of MI values for each cycle of the PWM carrier wave.

13. The method of claim 11, wherein the plurality of MI values comprises a first MI value corresponding to a frequency of a PWM carrier wave, a second MI value equal to 1, and a third MI value corresponding to the determined resonant frequency of the cable.

14. The method of claim 9, comprising determining, via the controller of the motor drive system, the resonant frequency of the cable during a start-up test of the motor drive system.

15. A method comprising:
   detecting, via at least one current sensor of a motor drive system, a current of output power produced by the motor drive system;
   determining, via a controller of the motor drive system, a resonant frequency of a cable connected to the motor drive system based at least in part on the detected current; and
   adjusting, via the controller of the motor drive system, pulse width modulation (PWM) switching of the motor drive system based at least in part on the determined resonant frequency of the cable.

16. The method of claim 15, comprising determining, via the controller of the motor drive system, a plurality of modulation index (MI) values based on the determined resonant frequency of the cable.

17. The method of claim 16, comprising adjusting, via the controller of the motor drive system, the PWM switching of the motor drive system based on a comparison of a PWM carrier wave and the plurality of MI values for each cycle of the PWM carrier wave.

18. The method of claim 16, wherein the plurality of MI values comprises a first MI value corresponding to a frequency of a PWM carrier wave, a second MI value equal to 1, and a third MI value corresponding to the determined resonant frequency of the cable.

19. The method of claim 15, comprising determining, via the controller of the motor drive system, the resonant frequency of the cable during a start-up test of the motor drive system.

20. The method of claim 15, comprising adjusting, via the controller of the motor drive system, the PWM switching of the motor drive system to compensate for transmission delay through the cable.

21. The method of claim 15, comprising adjusting, via the controller of the motor drive system, the PWM switching of the motor drive system to compensate for dead time relating to the PWM switching.

\* \* \* \* \*